United States Patent [19]

Rubak

[11] Patent Number: 4,707,228
[45] Date of Patent: Nov. 17, 1987

[54] DIAPHRAGM FOR ELECTROLYTIC AND ELECTROCHEMICAL CELLS

[75] Inventor: Irving L. Rubak, Hamden, Conn.

[73] Assignee: Treadwell Corporation, Thomaston, Conn.

[21] Appl. No.: 871,536

[22] Filed: Jun. 6, 1986

[51] Int. Cl.$^4$ .............................................. C25B 1/00
[52] U.S. Cl. .................................. 204/128; 204/129; 204/252; 204/256; 204/295; 204/296
[58] Field of Search .............. 204/129, 295, 296, 128, 204/252, 256; 428/225–227, 229, 258

[56] References Cited

U.S. PATENT DOCUMENTS

| | | | |
|---|---|---|---|
| 4,374,014 | 2/1983 | Smith et al. | 204/260 |
| 4,432,859 | 2/1984 | Andreassen et al. | 204/296 |
| 4,482,441 | 11/1984 | Indeherbergh et al. | 204/128 |
| 4,539,082 | 9/1985 | Klotz et al. | 204/93 |

FOREIGN PATENT DOCUMENTS 0164234 12/1985 European Pat. Off. .
3321159 12/1984 Fed. Rep. of Germany .

Primary Examiner—John F. Niebling
Assistant Examiner—Ben C. Hsing
Attorney, Agent, or Firm—Kenyon & Kenyon

[57] ABSTRACT

In one aspect a woven diaphragm for use in an electrolytic or in an electrochemical cell. The diaphragm is woven with yarns made from synthetic hydrophobic staple fibers having a linear density between about 1 and 10 denier. The diaphragm is between about 0.005 and 0.150 inches thick and has a weight between about 0.1 and 3.0 pounds per square yard. The diaphragm provides desirable ionic and hydraulic flow rates and a desirable cross cell voltage differential in operation of the cell.

21 Claims, 2 Drawing Figures

DIAPHRAGM FOR ELECTROLYTIC AND ELECTROCHEMICAL CELLS

This invention relates generally to diaphragms for use in electrolytic fuel cells and batteries, and more particularly to diaphragms for oxygen generators designed for use aboard submarines.

BACKGROUND OF THE INVENTION

Electrolytic cells have many and diverse commercial applications. These include the electrochemical manufacturing of chlorine, sodium, and fluorine, and the electrolytic generation of oxygen and hydrogen.

An electrolytic cell typically includes a vessel within which are enclosed positive and negatively charged electrodes, and an electrolyte that provides ionic contact between the anode and cathode electrodes. Where mixing of the products or reactants of electrolysis is undesirable, the cell is built with a diaphragm to separate the anode and cathode compartments. For example, in the electrolysis of brine to produce chlorine gas and hydrogen, any substantial mixing of the products is extremely hazardous, posing a great risk of explosion. Similarly, the hydrogen and oxygen generated from the electrolysis of water in an alkaline aqueous electrolyte, e.g., 30% KOH, must be effectively separated to avoid the risk of explosion. A porous diaphragm that permits ionic and hydraulic flow between the anode and cathode elements while preventing the diffusion of gasses is typically employed to separate the chlorine and hydrogen of brine electrolysis or the products of oxygen generation. It is desirable that the cross-cell voltage differential across the diaphragm be as small as possible to allow efficient operation of the cell. The qualities that make a diaphragm material desirable in an electrolytic cell are also important in electrochemical cells, such as batteries and fuel cells.

It is often desirable to operate electrolytic cells at pressures in excess of atmospheric pressure. For example, in an oxygen generating cell, a 200 fold increase in pressure results in an increase in reversible potential of only about 103 mV. The theoretical reversible cell voltage varies with pressure in this manner:

$$E_r = E^o + \frac{RT}{4F} \ln \frac{P_{H_2}(P_{O_2})^{\frac{1}{2}}}{P_{H_2O}}$$

Therefore, high pressure gas can be generated with only a minimal increase in electrolysis voltage. Electrolytic oxygen generators of the filter-press type are commonly constructed to operate at pressures of 30 atmospheres, eliminating the need for compressors in the gas line.

As a function of both space constraints and the large output required, oxygen generators for use aboard submarines operate at even higher pressures, typically about 200 atmospheres. In addition, submarine oxygen generators operate at elevated temperatures, often in excess of 300° F. An additional concern in submarine oxygen generators, for obvious reasons, is reliability and safety. The diaphragm is a critical component of such high pressure oxygen generators.

As discussed above, a diaphragm for use with an aqueous electrolyte must permit ionic and hydraulic flow, but effectively separate any gasses generated in the operation of the electrolytic cell. Impermeability to gasses becomes increasingly critical as operating pressure and temperature is increased. At the same time, however, the diaphragm must remain wettable and maintain a low cross-cell voltage differential. In addition, it is desirable that the diaphragm remain stable over prolonged periods of exposure to a highly caustic electrolyte at elevated temperatures.

Diaphragms for electrolytic cells are commonly made of asbestos. Asbestos diaphragms have the desirable properties of resistance to degradation when exposed to a caustic electrolyte at low and moderate temperatures, low gas diffusion rates under high pressure operating conditions, good ion transfer capabilities with low ohmic resistance, adequate osmotic and hydraulic flow rates, and sufficient tensile strength for durability and convenience both in handling and in cell construction. However, it is desirable to find a substitute material to replace asbestos diaphragms for electrolytic cells. Asbestos poses health risks to workers who are exposed to it in the dry form, and asbestos deteriorates over time under the severe operating conditions commonly found in electrolytic cells. Also, under high temperature conditions asbestos reacts chemically with concentrated caustic to form soluble silicates and magnesium hydroxide (Brucite). This limits the useful life span of asbestos in many applications. Synthetic polymers, on the other hand, like polyphenylene sulfide and polyetheretherketone, do not react chemically with caustic and therefore last longer under the same operating conditions. This is an improvement over the present state of the art.

Asbestos is a unique diaphragm material, being a hydrophilic, durable, mineral fiber that can be woven into a fabric. Any substitute material for asbestos would desirably match or exceed asbestos with respect to its desirable qualities, and not suffer from the above-mentioned disadvantages. Natural textiles generally lack the necessary stability when exposed to caustic electrolytes. Synthetic fibers are generally hydrophobic with insufficient wettability for diaphragm applications.

Fabrics are characterized generally as woven or unwoven. Woven fabrics are made from yarn. Warp yarns are stretched across a loom at considerable tension, and filling yarns, i.e., weft or woof yarns, are inserted and interlaced at right angles to the warp. Warp yarns are generally more highly twisted and less extensible than filling yarns.

Yarns are generally of two types: multifil and staple. A multifil yarn is made from individual very long continuous fibers. A staple yarn is made from shorter fibers, typically ½ to 3 inches each in length, which are spun to form the yarn. In general, yarns formed from staple fibers are bulkier, softer, and have a rougher surface texture than continuous multifil yarns. Beyond a certain minimum length required for successful manufacturing of staple yarn, the length of the individual fibers has very little effect on the properties of the resulting yarn. In contrast, the denier, a measure of linear density, of the individual staple fibers has a striking effect on the resulting yarn. Filament fibers that make up monofil yarn are, for the most part, synthetics. Asbestos is a staple fiber. Silk is the only commonly used natural textile material where the individual fibers are long enough to make multifil yarn. Synthetic filaments are formed by extrusion processes e.g., melt, dry, or wet spinning. Common synthetics include polyacrylics, rayon, polyester, nylon, polyethylene and polypropylene. Long continuous synthetic filaments can be processed directly into multifil yarns. Short staple fibers can be carded and spun into staple yarn.

Felt is made by pressing staple fibers together and can be accomplished through the action of heat, moisture, chemicals, and pressure. This process may also include the step of needling individual staple fibers into a loosely woven cloth, called a scrim.

In light of the foregoing, it is an object of this invention to provide an asbestos-free diaphragm for use in an electrolytic cell.

It is a further object of the invention to provide a diaphragm that can withstand exposure to a caustic electrolyte at elevated operating temperatures and pressures for prolonged periods of time.

It is a further object of the invention to provide a diaphragm capable of preventing undesirable gas diffusion without undesirably impeding ionic or hydraulic flow rates under elevated pressure conditions.

It is a further object of the invention to provide a diaphragm capable of maintaining a desirably low cross-cell voltage differential when operated under high current density conditions.

It is yet a further object of the invention to provide an asbestos-free electrolytic gas generator capable of operating under severe conditions of temperature and pressure.

It is yet a further object of the invention to provide a process for electrolytically generating oxygen in an electrolytic cell employing an asbestos-free diaphragm.

SUMMARY OF THE INVENTION

The present invention provides a woven diaphragm fabric for use in an electrolytic or electrochemical cell having warp and weft yarns made from synthetic staple fibers having a linear density between about 1 and 9 denier. The diaphragm is between about 0.005 and 0.150 inches thick and has a density between about 0.1 and 3.0 pounds per square yard. The diaphragm provides desirable ionic and hydraulic flow rates and a desirable cross cell voltage differential in operation of the cell.

In preferred embodiments, the staple fibers are polyphenylene sulfide or polyphenyletheretherketone. In further preferred embodiments the diaphragm is between about 0.068 and 0.150 inches thick, has a weight between about 1.4 and 2.4 lbs/yd$^2$, and is capable of providing an effective gas barrier at operating pressures in excess of 100 atmospheres.

The invention also provides a nonwoven diaphragm made up of synthetic hydrophobic staple fibers having a linear density between about 1 and about 10 denier. The diaphragm has a weight between about 0.1 and 3.0 pounds per square yard.

BRIEF DISCRIPTION OF THE DRAWINGS

DESCRIPTION OF THE PREFERRED EMBODIMENT

Figure 1:
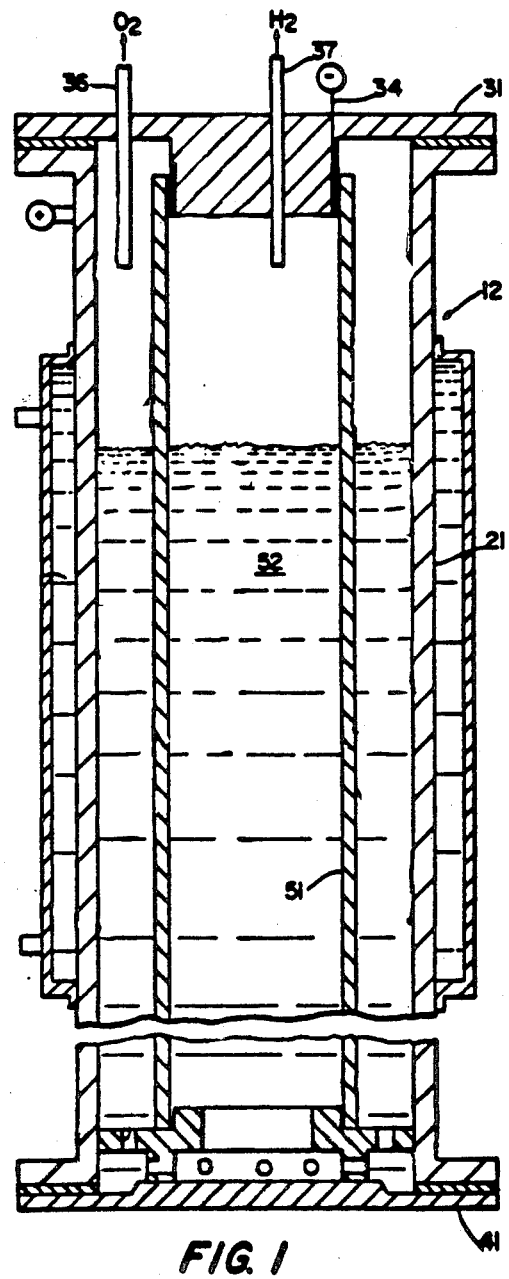
FIG. 1 is a cross-sectional view of a gas generator employing a diaphragm of the present invention.

In accordance with the present invention it has been discovered that fabric manufactured from synthetic hydrophobic stable fibers unexpectedly exhibit a desirable combination of characteristics for use as diaphragms in electrochemical and electrolytic cells, including good wettability, low cross cell voltage differential, and effective gas separation. Diaphragms woven from staple yarns are especially preferred, as such diaphragms exhibit superior voltage differential and gas separation characteristics, especially under high temperature, high pressure conditions when compared to prior art diaphragms. Unwoven, e.g. felt diaphragms manufactured from synthetic hydrophobic staple fibers also exhibit favorable characteristics for diaphragms but are less effective at higher pressures.

Preferred staple fibers are polyphenylene sulfide (PPS) and polyphenylether ether ketone (PEEK). Individual fibers range from about $\frac{1}{2}$ to about 5 inches in length, preferably about 2 inches in length and have a linear density of from about 1 to about 9 denier, preferably 3 denier. A lubricant and anti-static agent, e.g., a surfactant may be added to the staple fibers for ease in handling.

Where a woven diaphragm is desired, the individual staple fibers are formed into yarns which are woven into a fabric. The staple fibers are twisted after carding in the range of about $2\frac{1}{2}$ to about 5 turns per inch. Yarns made with staple fibers having fewer than $2\frac{1}{2}$ turns per inch do not hold together well under normal mechanical stress, while yarns with more than 5 turns per inch are subject to undesirable kinking. It is preferred that the use of cottonizing fibers be avoided in producing yarns with staple fibers because when such cottonizing fibers are dissolved out of the staple yarns after weaving the porosity of the finished fabric is undesirably increased and the tensile strength of the yarns is decreased. The use of cottonizing fibers is also uneconomical.

Staple yarns may then be woven into a useful diaphragm fabric. The configuration of the resulting fabric must be such that the capillarity of the material overcomes the natural hydrophobicity of the fibers, rendering the material wettable. Twisting the yarns increases the capillarity of the resulting fabric. If the woven fabric is not wettable, then it will have inadequate ionic and hydraulic transfer properties, will not provide an adequate barrier to gasses generated in the operation of an electrolytic cell and thus will not perform satisfactorily as a diaphragm.

Fabrics useful as diaphragms are of a thickness selected depending on the operating environment in a particular cell. Generally a thinner diaphragm will create a lower cross cell voltage differential while a thicker diaphragm will provide superior gas separation. A woven diaphragm according to the invention should have a thickness of about 0.005 to 0.150 inch, preferably about 0.068 to 0.140 inches, and a weight of about 0.1 to 3.0 lbs/yd$^2$, preferably about 1.4 to 2.4 lbs/yd$^2$. Woven diaphragms within the preferred range for weight and thickness provide an effective gas barrier even at ultra-high operating pressures, i.e., in excess of 100 atmospheres. An effective gas barrier is not necessarily an absolute gas barrier. Generally, contamination rates of as much as 3% between the anode and cathode compartments are possible, while 2% or below is considered acceptable, at 200 atmospheres.

A nonwoven diaphragm can be manufactured from hydrophobic staple fibers in accordance with the present invention. The fibers can be formed into a felt by applying heat, moisture, chemicals, and pressure, as is known in the art. Preferably, a nonwoven felt is formed by needling individual hydrophobic staple fibers into a loosely woven scrim. A scrim may be made, for example, from PPS or polytetrafluorethylene fibers of the multifil or staple type. The resulting felt can then be compressed by calendering. Nonwoven felt diaphragms are presently unsuited for ultra-high pressure applications where electrolysis is carried out at pressures in excess of about 100 atmospheres because they are relatively porous which causes an undesirably high gas diffusion rate at ultra-high pressures. The porosity of a felt can be reduced by compressing the fibers. The felt diaphragms of this invention are generally more suitable for electrolysis at atmospheric and moderately elevated pressures, and for other applications, e.g., as separators for batteries and certain types of fuel cells.

If surfactant compounds are applied to the fibers as a lubricant/anti-static agent for carding and spinning operations, then it may be necessary to remove the agent, either from the finished cloth, from the individual fibers, or in the case of woven cloth from the twisted staple yarns before the yarns are woven into the diaphragm. Removal of the agent can be accomplished by washing with 1,1,1-trichloroethane, freon, or similar solvents. Alternatively, a caustic extraction technique can be employed to remove the agent. Under the caustic operating conditions found in many kinds of electrolytic cells, fatty acids may form soaps and cause foaming, which can interfere with the operation of the cell. An alternative method for avoiding foaming is to coat the fibers with, e.g., a silicone finish, or any other non-foaming lubricant/anti-static agent.

In operation, a synthetic wettable staple fiber diaphragm according to the invention is utilized in a conventional electrolytic or electrochemical cell. For example, diaphragms according to the invention can be used in chlorine or oxygen generating cells, as separators for batteries or fuel cells, or in other electrolytic and electrochemical processes. Woven diaphragms according to the invention are particularly suited for use in a high pressure electrolytic oxygen generator onboard a submarine, such as the one described in Smith et. al., U.S. Pat. No. 4,374,014, hereby incorporated by reference.

Referring now to the drawings there is shown an electrolytic oxygen generator employing a woven diaphragm of synthetic wettable staple yarns according to the invention. The oxygen generator 12 essentially includes a cylindrical housing 21, end caps 31 and 41 that seal the end portions of housing 21, an electrode assembly 51 supported within housing 21, and an electrolyte 52 filling a substantial portion of housing 21. A preferred electrolyte is a 30% aqueous solution of KOH. A 30% concentration maximizes the conductivity of the electrolyte. This generator is constructed to withstand operating pressures in excess of 200 atmospheres.

Figure 2:
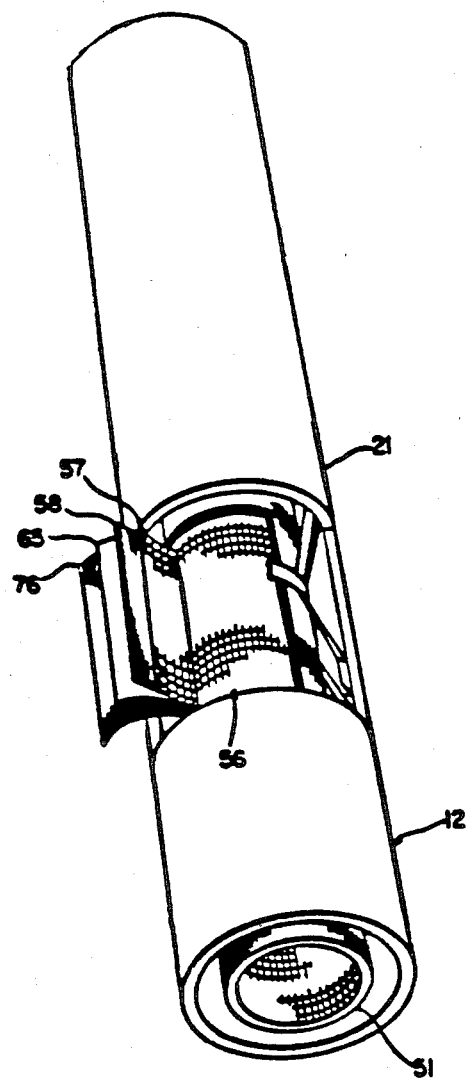
FIG. 2 is a perspective view partially broken away of the gas generator of FIG. 1.

As better seen in FIG. 2, the electrode assembly 51 includes a central cathode portion having a central tubular support element, a metallic cathode screen 57 wrapped around the support element 56, and a metallic cathode mesh 58 secured to the underlying cathode screen 57. A diaphragm 65, woven from yarns made from synthetic staple fibers, is wrapped around the cathode structure 56-58. For high pressure operation, it is preferred that the diaphragm has a thickness of about 0.080 to 0.140 inches and a density of about 1.4 to 2.5 lbs/yd$^2$. A thinner diaphragm could be used if several layers are wrapped around the cathode. A wire mesh anode 76 circumferentially encloses diaphragm 65. Hydrogen generated in the cathode regions of the electrode is removed from the housing 21 through hydrogen conduit 37. Similarly, oxygen generated in the anode regions of the electrode is removed from the housing through oxygen conduit 36. The woven diaphragm 65 according to the invention will be sufficiently wettable to provide a low resistance path for hydroxyl ions and permit the diffusion of water molecules from the anolyte to the catholyte solution. Gas contamination will be less than about 3.0% hydrogen in the oxygen stream and less than about 3.0% oxygen in the hydrogen stream. Furthermore the generator will operate with a cross cell voltage differential of less than about 3.5 volts.

EXAMPLE I

PPS staple fiber is available from Phillips Petroleum Corp., U.S.A. This fiber is sold under the Ryton ® trademark, type V01, with individual fibers of 2 inches in length and 3 denier. Such fibers were spun into a yarn which was woven into a twill material having a thickness of about 0.120 inches, a warp-filling count of 36×9.0, with 1520 warp and filling yarns. The material had a weight of 2.35 lbs/yd$^2$, and a Frazier permeability of 21 Air-CFM.

The material was further characterized by a Bubble Point pressure of 0.238 PSI, and helium permeation of 240 cc/SEC at 0.3 PSI. Mercury intrusion porisimetry revealed 68.1% porosity, a maximum pore diameter of 189.2 microns, and an average pore diameter of 32.8 microns. The diaphragm was installed in a high pressure oxygen generator to which 30% KOH electrolyte was added. The generator provided with the PPS staple fiber diaphragm was operated under high current density conditions and a pressure exceeding 200 atmosphere and had a cross-cell voltage of 3.0 volts and a gas impurity analysis of 1.3% hydrogen in the oxygen stream and 0.35% oxygen in the hydrogen stream. This diaphragm showed no signs of significant deterioration after 1600 hours of operation, and its useful life would be expected to exceed 6000 or more hours.

EXAMPLE II

Type V00 Ryton PPS staple fiber 2 inches in length and 3 denier is available from Phillips Petroleum Corp. Such fibers were spun into yarn which was woven in a plain weave to make a diaphragm having a thickness of about 0.095 inches, a warp-filling count of 24×8, with 1520 warp and filling yarns. The diaphragm had a weight of 1.70 lbs/yd$^2$, and a Frazier permeability of 17 Air-CMF. The diaphragm was installed in a cell similar to the cell described in Example I. Operating at full amperage, the cell generated temperatures ranging from 214°−308° F. with a cross-cell voltage of 3.10 volts and a gas impurity analysis of 1.1% hydrogen in the oxygen stream and 0.3% oxygen in the hydrogen stream. This diaphragm showed no signs of significant deterioration after 8200 hours of operation.

EXAMPLE III

The same type fibers used in Example II were employed in a plain weave diaphragm having a thickness of 0.075 inches, a warp-filling count of 30×10, and 2020 warp and filling yarns. The diaphragm had a weight of 1.65 lbs/yd$^2$, and a Frazier permeability of 13 Air-CFM. The diaphragm was installed in a cell similar to the cell described in Example I. Operating at full amperage and with a modified cooling configuration, the cell generated temperatures ranging from 173°-288° F., with a cross-cell voltage of 3.17 volts and a gas impurity analysis of 1.45% hydrogen in the oxygen stream and 0.41% oxygen in the hydrogen stream. The diaphragm showed no signs of significant deterioration after 7500 hours of operation.

EXAMPLE IV

A fiber felt mat diaphragm was prepared by needling PPS staple fibers into a loosely woven PPS scrim. The needled fibers were 2 inches long with a denier of 3. The diaphragm had a thickness of 0.088 inches.

The felt diaphragm was used in a glass-tee electrolysis device under atmospheric pressure with a 30% KOH electrolyte solution. At a current of 15 amps, operating temperature ranged from ambient to 100° F. A single layer felt diaphragm provided a cross-cell voltage differential of 2.68 volts and a gas impurity analysis of 1.0% hydrogen in the oxygen stream and 0.2% oxygen in the hydrogen stream. A double layer felt diaphragm provided a cross-cell voltage differential of 2.74 volts and a gas impurity analysis of 0.92% hydrogen in the oxygen stream and 0.26% oxygen in the hydrogen stream.

EXAMPLE V

A two layer PPS felt diaphragm as described in Example IV was installed in a cell such as the cell described in Example I. After four hours of operation at 750 amps and at a pressure of 3000 PSI, the oxygen stream contained 3.0% hydrogen, and the hydrogen stream contained 1.4% oxygen.

Other Embodiments

Other embodiments are within the following claims. For example, diaphragms manufactured in accordance with the invention can be used in various types of electrolytic cells. Their wettability, effectiveness as a gas barrier, and resistance against deterioration under severe conditions are advantageous for use in e.g., chlorine generating electrolytic cells, and in batteries and fuel cells, including those utilizing phosphoric acid as an electrolyte.

What is claimed is:

1. A woven diaphragm for use in electrolytic or in electrochemical cells comprising warp yarns and weft yarns, wherein:
   said warp yarns and said weft yarns consist essentially of synthetic hydrophobic staple fibers having a linear density between about one and about seven denier;
   said diaphragm is between about 0.005 and 0.150 inches thick and has a density between about 0.1 and 3.0 pounds per square yard; and
   said diaphragm is capable of providing separation of gases generated in the operation of the cell without impeding ionic and hydraulic flow rates and a cross cell voltage differential less than about 3.5 volts in the operation of the cell.

2. The diaphragm of claim 1 wherein said staple fibers comprise polyphenylene sulfide.

3. The diaphragm of claim 1 wherein said staple fibers comprise polyphenyletheretherketone.

4. The diaphragm of claim 1 wherein said fibers have a linear density of about 3 denier.

5. The diaphragm of claim 1, wherein said diaphragm is between about 0.080 and 0.140 inches thick, has a weight between about 1.4 and 2.5 pounds per square yard, and is capable of providing an effective gas barrier at operating pressures in excess of 100 atmospheres.

6. The diaphragm of claim 1 wherein the warp and weft yarns have a twist in the range of about 2½ to 5 turns per inch.

7. A nonwoven diaphragm for use in electrolytic or electrochemical cells, comprising synthetic hydrophobic staple fibers having a linear density between about one and about seven denier, wherein said diaphragm has a density between about 0.5 and 2.0 pounds per square yard and is capable of providing separation of gases generated in the operation of the cell without impeding ionic and hydraulic flow rates and a cross cell voltage differential less than about 3.5 volts in the operation of the cell.

8. The diaphragm of claim 7 wherein said diaphragm comprises felt material.

9. The diaphragm of claim 7 wherein said fibers comprise polyphenylene sulfide.

10. The diaphragm of claim 7 wherein said fibers comprise polyphenyletheretherketone.

11. An electrolytic cell comprising:
    a housing; and
    an electrode assembly supported within said housing, said electrode assembly including a cathode, a diaphragm, and an anode; wherein
    said diaphragm is disposed so that it separates said cathode from said anode, and said diaphragm is woven and comprises warp yarns and weft yarns, wherein:
    said warp yarns and said weft yarns consist essentially of synthetic hydrophobic staple fibers having a linear density between about 1 and about 10 denier;
    said diaphragm is between about 0.005 abd 0.150 inches thick and has a density between about 0.1 and 3.0 pounds per square yard; and
    said diaphragm is capable of providing separation of gasses generated in the operation of the cell without impeding ionic or hydraulic flow rates therethrough.

12. The cell of claim 11 wherein said staple fibers comprise polyphenylene sulfide.

13. The cell of claim 11 wherein said staple fibers comprise polyphenyletheretherketone.

14. The cell of claim 11, wherein said diaphragm is between about 0.080 and 0.140 inches thick, has a density between about 1.4 and 2.5 pounds per square yard, and is capable of providing an gas barrier at operating pressures in excess of 100 atmospheres.

15. The cell of claim 11 wherein said cell is an oxygen generating cell adapted for use on board a submarine.

16. The diaphragm of claim 11 wherein the warp and weft yarns have a twist in the range of about 2½ to 5 turns per inch.

17. A process for generating gas electrolytically, comprising:
    providing an electrolytic gas generating cell comprising a housing and an electrode assembly supported within said housing, said electrode assembly including a cathode, a diaphragm, and an anode, wherein said diaphragm is disposed so that it separates said cathode from said anode, and said diaphragm is woven and consists essentially of warp yarns and weft yarns,
    wherein:
    said warp yarns and said weft yarns comprise synthetic hydrophobic staple fibers having a linear density between about 1 and about 10 denier;

said diaphragm is between about 0.005 and 0.150 inches thick and has a density between about 0.1 and 3.0 pounds per square yard; and said diaphragm is capable of providing separation of gasses generated in the operation of the cell without impeding ionic or hydraulic flow rates therethrough;

introducing a caustic aqueous electrolyte into the housing;

applying an electrical current to the cell; and producing a first gas at the cathode and a second gas at the anode.

18. The process of claim 17, wherein said staple fibers comprise polyphenylene sulfide.

19. The process of claim 17, wherein said staple fibers comprise polyphenyletheretherketone.

20. The process of claim 17, wherein said diaphragm is between about 0.080 and 0.140 inches thick, has a weight between about 1.4 and 2.5 pounds per square yard, and is capable of providing an effective gas barrier at operating pressures in excess of 100 atmospheres.

21. The diaphragm of claim 14 wherein the warp and weft yarns have a twist in the range of about $2\frac{1}{2}$ to 5 turns per inch.

* * * * *